United States Patent
Adrian (10) Patent No.: US 9,798,362 B2
(45) Date of Patent: Oct. 24, 2017

(54) STORAGE DEVICE STORAGE TRAY WITH LEAF SPRING RETAINERS

(71) Applicant: Facebook, Inc., Menlo Park, CA (US)

(72) Inventor: Jason David Adrian, Menlo Park, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 14/940,367

(22) Filed: Nov. 13, 2015

(65) Prior Publication Data
US 2017/0139450 A1   May 18, 2017

(51) Int. Cl.
*G06F 1/18* (2006.01)
*G06F 1/20* (2006.01)

(52) U.S. Cl.
CPC .............. *G06F 1/184* (2013.01); *G06F 1/187* (2013.01); *G06F 1/20* (2013.01)

(58) Field of Classification Search
CPC .............. G06F 1/184; G06F 1/187; G06F 1/20
USPC .............. 361/679.33, 679.39, 679.37, 679.35
See application file for complete search history.

(56) References Cited

U.S. PATENT DOCUMENTS

| | | | |
|---|---|---|---|
| 6,188,571 B1 * | 2/2001 | Roganti | G06F 1/184 361/679.33 |
| 6,778,387 B2 | 8/2004 | Fairchild et al. | |
| 7,256,989 B2 | 8/2007 | Liu et al. | |
| 7,394,660 B2 | 7/2008 | Hidaka et al. | |
| 7,593,221 B2 * | 9/2009 | Sheng | G11B 33/1493 361/679.35 |
| 7,719,834 B2 * | 5/2010 | Miyamoto | G06F 1/187 312/223.2 |
| 7,864,519 B2 | 1/2011 | Lin et al. | |
| 8,400,765 B2 | 3/2013 | Ross et al. | |
| 8,477,491 B1 | 7/2013 | Ross et al. | |
| 8,913,377 B2 * | 12/2014 | Furuta | H05K 7/1489 361/679.33 |
| 8,991,949 B2 | 3/2015 | Johnson et al. | |

(Continued)

OTHER PUBLICATIONS

Non-Final Office Action dated Oct. 17, 2016, for U.S. Appl. No. 14/940,347 by Adrian, J., et al., filed Nov. 13, 2015.

(Continued)

*Primary Examiner* — Hoa C Nguyen
*Assistant Examiner* — Keith Depew
(74) *Attorney, Agent, or Firm* — Perkins Coie LLP (57) ABSTRACT

Technology is provided for a storage device storage tray for use with one or more storage devices. The storage device storage tray includes a chassis including at least one storage region and a motherboard attached to the chassis. A storage frame is positioned in the storage region and is pivotable relative to the chassis between a storage position and an access position. The storage frame comprises first and second substantially parallel panels and a backplane extending therebetween. A data communications cable interconnects the backplane and the motherboard. A plurality of dividers extend away from the backplane between the first and second substantially parallel panels to define a plurality of drive bays configured to receive a respective storage device. A leaf spring retainer is positioned in each drive bay to urge the storage devices against the second panel to hold the storage devices in their respective drive bays.

20 Claims, 5 Drawing Sheets

(56) References Cited

U.S. PATENT DOCUMENTS

| | | | |
|---|---|---|---|
| 9,042,094 B2* | 5/2015 | Williams | G06F 1/16 361/679.37 |
| 9,265,173 B1 | 2/2016 | Chung et al. | |
| 9,361,946 B2* | 6/2016 | Bell | G11B 33/08 |
| 9,380,722 B2 | 6/2016 | Junkins | |
| 9,437,250 B2* | 9/2016 | Mundt | G11B 33/124 |
| 9,468,127 B2* | 10/2016 | Chen | H05K 7/20736 |
| 9,690,335 B2 | 6/2017 | Adrian et al. | |
| 2003/0222550 A1* | 12/2003 | Boswell | G06F 1/182 312/223.2 |
| 2004/0130861 A1* | 7/2004 | Beall | H05K 7/1454 361/679.02 |
| 2004/0190266 A1* | 9/2004 | Chung | G06F 1/184 361/724 |
| 2005/0168932 A1* | 8/2005 | Selvidge | G06F 1/184 361/679.33 |
| 2006/0181845 A1 | 8/2006 | Shah et al. | |
| 2007/0014085 A1* | 1/2007 | Meserth | G06F 1/184 361/679.35 |
| 2008/0158810 A1* | 7/2008 | Liu | G11B 33/124 361/679.33 |
| 2008/0165490 A1* | 7/2008 | Buckland | G11B 33/128 361/679.33 |
| 2009/0109609 A1* | 4/2009 | Lai | G06F 1/187 361/679.39 |
| 2009/0168325 A1* | 7/2009 | Yeh | G11B 33/022 361/679.33 |
| 2010/0020438 A1* | 1/2010 | Gross | G11B 33/08 360/97.19 |
| 2010/0277861 A1 | 11/2010 | Roesner et al. | |
| 2011/0058328 A1 | 3/2011 | Ajo et al. | |
| 2011/0228473 A1 | 9/2011 | Anderson et al. | |
| 2011/0255235 A1* | 10/2011 | Chen | G06F 1/187 361/679.33 |
| 2012/0113582 A1* | 5/2012 | Hirano | G06F 1/187 361/679.33 |
| 2012/0243170 A1* | 9/2012 | Frink | G06F 1/187 361/679.34 |
| 2013/0120927 A1* | 5/2013 | Wen | G06F 1/187 361/679.39 |
| 2013/0176676 A1* | 7/2013 | Keffeler | H05K 7/1487 361/679.37 |
| 2013/0229766 A1 | 9/2013 | Williams et al. | |
| 2013/0229767 A1* | 9/2013 | Ganta Papa Rao Bala | G11B 33/128 361/679.37 |
| 2014/0021836 A1* | 1/2014 | Hou | G11B 33/02 312/223.2 |
| 2014/0085806 A1* | 3/2014 | Song | G06F 1/183 361/679.37 |
| 2015/0077924 A1* | 3/2015 | Rauline | H05K 7/1489 361/679.39 |
| 2015/0103482 A1* | 4/2015 | Saito | G11B 33/128 361/679.39 |
| 2015/0146353 A1* | 5/2015 | MacNeil | G06F 1/187 361/679.02 |
| 2015/0163964 A1* | 6/2015 | Lam | G06F 1/187 361/679.31 |
| 2015/0271943 A1* | 9/2015 | Peng | H05K 7/1487 361/679.39 |
| 2016/0103469 A1* | 4/2016 | Kyle | G06F 1/16 361/679.58 |
| 2016/0110307 A1* | 4/2016 | Lin | G06F 13/4081 710/302 |
| 2016/0132078 A1* | 5/2016 | Shen | G06F 1/184 361/679.32 |
| 2016/0135322 A1* | 5/2016 | Chen | G11B 33/142 361/679.46 |
| 2017/0139449 A1 | 5/2017 | Adrian et al. | |

OTHER PUBLICATIONS

U.S. Appl. No. 14/940,347 by Adrian, J., et al., filed Nov. 13, 2015.
Notice of Allowance dated Apr. 21, 2017 of U.S. Appl. No. 14/940,347 by Adrian, J. filed Nov. 13, 2015.

* cited by examiner

STORAGE DEVICE STORAGE TRAY WITH LEAF SPRING RETAINERS

TECHNICAL FIELD

This patent application is directed to data storage server configurations and, more specifically, to storage device storage trays.

BACKGROUND

Traditional storage device storage trays are usually configured to accept 3.5 inch hard disc drives (HDDs). However, as technology has matured, other storage devices, such as 2.5 inch solid state drives (SSDs), are available with higher storage density and lower cost. Thus, in some cases, it may be desirable to upgrade to a different storage device type and/or size. For example, in some cases, it may be desirable to replace 3.5 inch HDDs with 2.5 inch SSDs. In addition, 2.5 inch SSDs are physically smaller than 3.5 inch HDDs, thereby allowing more drives within the same storage tray form factor. Also, 2.5 inch SSDs are available in a range of thicknesses. Accordingly, there is a need for storage device storage trays that can accept SSDs of different thicknesses within the same storage tray form factor as the traditional 3.5 inch HDD storage tray.

BRIEF DESCRIPTION OF THE DRAWINGS

Embodiments of the storage device storage tray introduced herein may be better understood by referring to the following Detailed Description in conjunction with the accompanying drawings, in which like reference numerals indicate identical or functionally similar elements.

The headings provided herein are for convenience only and do not necessarily affect the scope or meaning of the claimed embodiments. Further, the drawings have not necessarily been drawn to scale. For example, the dimensions of some of the elements in the figures may be expanded or reduced to help improve the understanding of the embodiments. Moreover, while the disclosed technology is amenable to various modifications and alternative forms, specific embodiments have been shown by way of example in the drawings and are described in detail below. The intention, however, is not to limit the embodiments described. On the contrary, the embodiments are intended to cover all modifications, equivalents, and alternatives falling within the scope of the embodiments as defined by the appended claims.

DETAILED DESCRIPTION

Overview

A storage device storage tray is disclosed for use with one or more storage devices. In an embodiment, the storage device storage tray includes a chassis including at least one storage region, and a motherboard attached to the chassis. A storage frame is positioned in the storage region and is pivotable relative to the chassis between a storage position and an access position. The storage frame comprises first and second substantially parallel panels and a backplane extending therebetween. In some embodiments, a data communications cable interconnects the backplane and the motherboard. A plurality of dividers extend away from the backplane and are positioned between the first and second substantially parallel panels to define a plurality of drive bays, each configured to receive a respective storage device. A leaf spring retainer is positioned in each drive bay to urge the storage devices against the second panel to hold the storage devices in their respective drive bays.

General Description

Various examples of the devices introduced above will now be described in further detail. The following description provides specific details for a thorough understanding and enabling description of these examples. One skilled in the relevant art will understand, however, that the techniques discussed herein may be practiced without many of these details. Likewise, one skilled in the relevant art will also understand that the technology can include many other features not described in detail herein. Additionally, some well-known structures or functions may not be shown or described in detail below so as to avoid unnecessarily obscuring the relevant description.

The terminology used below is to be interpreted in its broadest reasonable manner, even though it is being used in conjunction with a detailed description of some specific examples of the embodiments. Indeed, some terms may even be emphasized below; however, any terminology intended to be interpreted in any restricted manner will be overtly and specifically defined as such in this section.

Figure 1:
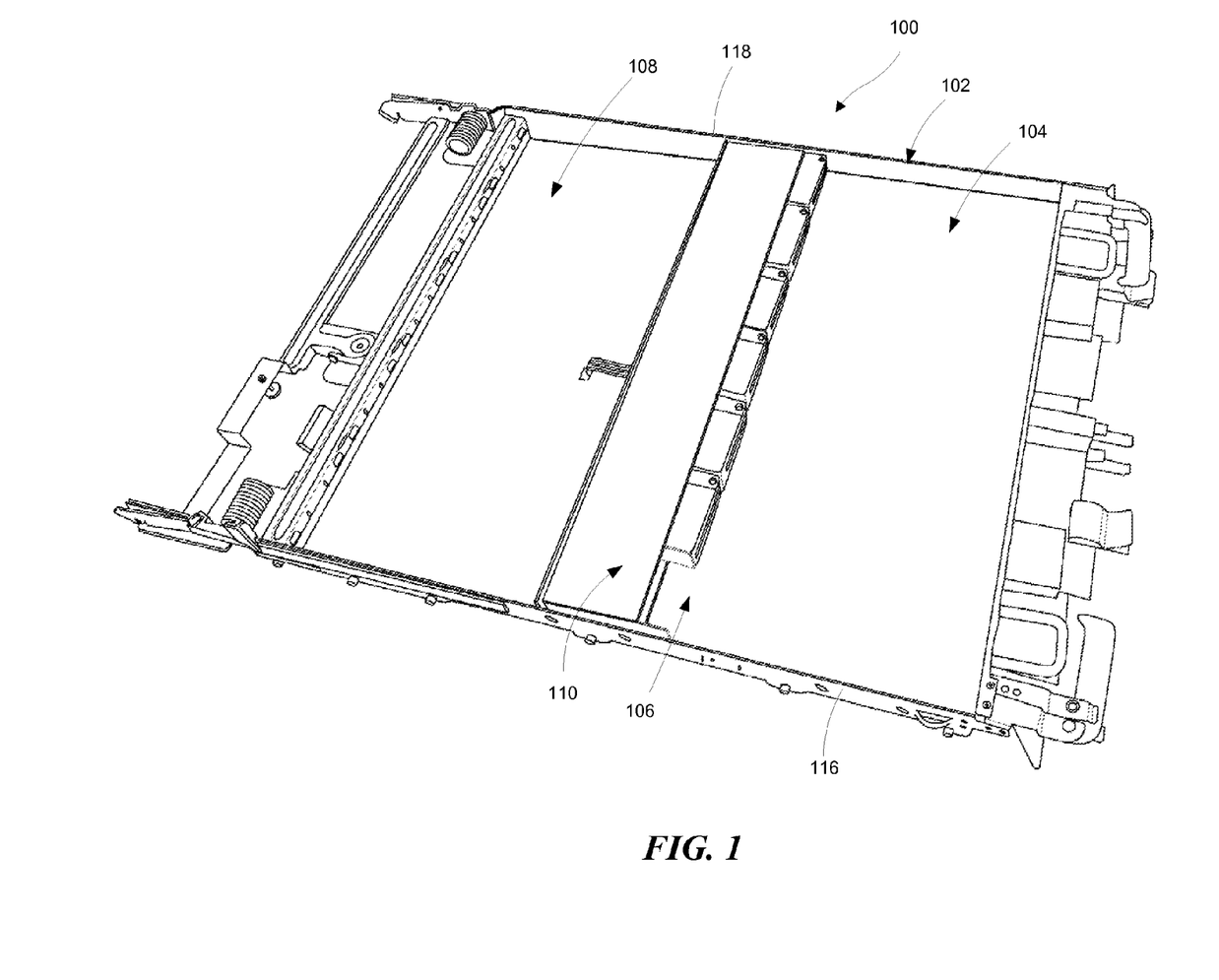
FIG. 1 is a perspective view of a storage device storage tray according to a representative embodiment.

As shown in FIG. 1, the storage device storage tray 100 includes a chassis 102 comprising a pair of opposed sidewalls 116 and 118 and storage regions 104, 106, and 108. A storage frame 110 is positioned in at least one of the storage regions, such as the storage region 106. Although the embodiment depicted in FIG. 1 illustrates a single storage frame 110 positioned in storage region 106, additional storage frames 110 can be positioned in storage regions 104 and 108. A plurality of the storage device storage trays 100 can be removably installed in a server rack (not shown) for a compact, relatively dense configuration of multiple storage devices in a relatively small footprint.

Figure 2:
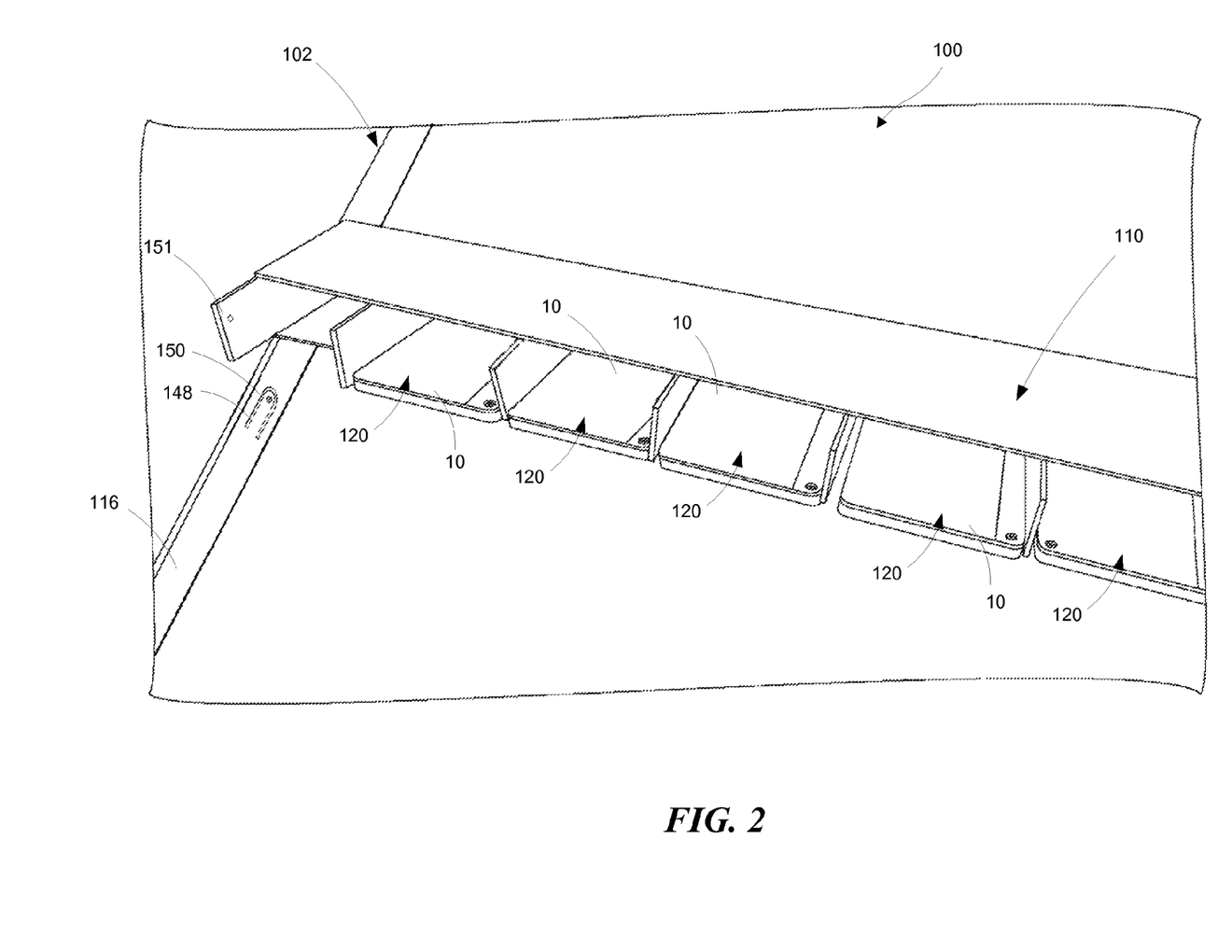
FIG. 2 is an enlarged partial perspective view of the storage device storage tray shown in FIG. 1 with the storage frame positioned in an access position.

With further reference to FIG. 2, the storage frame 110 can be rotated with respect to the chassis 102 between a storage position, as shown in FIG. 1, and an access position, as shown in FIG. 2. When the storage frame 110 is in the access position, one or more conventional storage devices 10 can be easily accessed. The storage frame 110 includes a plurality of drive bays 120 configured to receive the storage devices 10. In some embodiments, the drive bays 120 are configured to receive 2.5 inch SSDs. Accordingly, the storage frame 110 can contain multiple storage devices 10 in the same form factor as a conventionally-sized storage tray. For example, the storage frame 110 can contain seven 2.5 inch SSDs where a conventional storage tray contains only five 3.5 inch HDDs. In some embodiments, the opposed sidewalls 116 and 118 each include a latch 148 to help releasably, yet securely, retain the storage frame 110 in the storage position. In the illustrated embodiment, the latch 148 includes a detent protrusion 150 that cooperates with a divot 151 formed in the storage frame 110.

Figure 3:
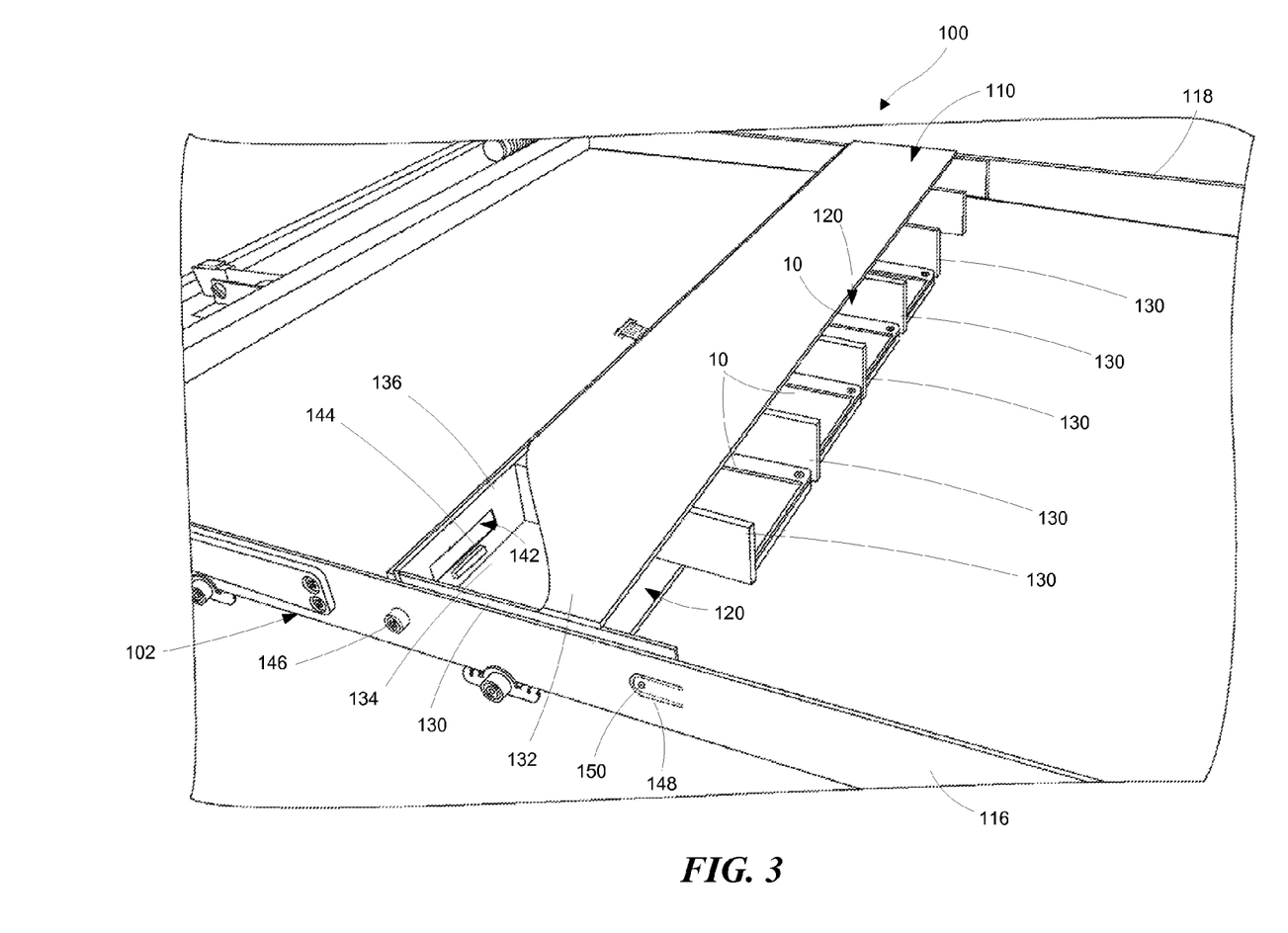
FIG. 3 is an enlarged partial perspective view of the storage device storage tray shown in FIGS. 1 and 2 as viewed from the side of the storage device storage tray.

As shown in FIG. 3, the storage frame 110 includes substantially parallel first and second panels 132 and 134, and a backplane 136 extending between the first and second panels 132 and 134. In the illustrated embodiment, the backplane 136 can be, or include, a printed circuit board. A plurality of dividers 130 are disposed between the first and second panels 132 and 134 and extend away from the backplane 136 to define the plurality of drive bays 120. In some embodiments, the dividers 130 extend beyond the first and second panels 132, 134. The storage frame 110 is pivotably coupled to the chassis 102 by a pair of fasteners 146. The storage frame 110 may be comprised of any suitable material, such as sheet metal or plastic, for example.

The backplane 136 includes a plurality of connectors 144, each configured to operatively mate with a storage device 10, and wherein a connector 144 corresponds to each drive bay 120. Accordingly, a storage device 10 can be received into each drive bay 120 and is connected to a corresponding connector 144. The backplane 136 also includes a plurality of air flow apertures 142 positioned above each of the connectors 144 that facilitate airflow within the drive bays 120 relative to the storage devices 10. The backplane 136 with integrated connectors 144 pivots relative to the chassis 102 as the storage frame 110 pivots, such that the storage device 10 can be plugged into the connector 144 associated with the selected drive bay 120 when the storage frame 110 is in the access position. Another example of a storage device storage tray and storage frame is disclosed in co-pending United States Patent Application identified as Ser. No. 14/940,347, the disclosure of which is incorporated herein by reference in its entirety. To the extent the incorporated reference conflicts with the present disclosure, the present disclosure controls.

Figure 4:
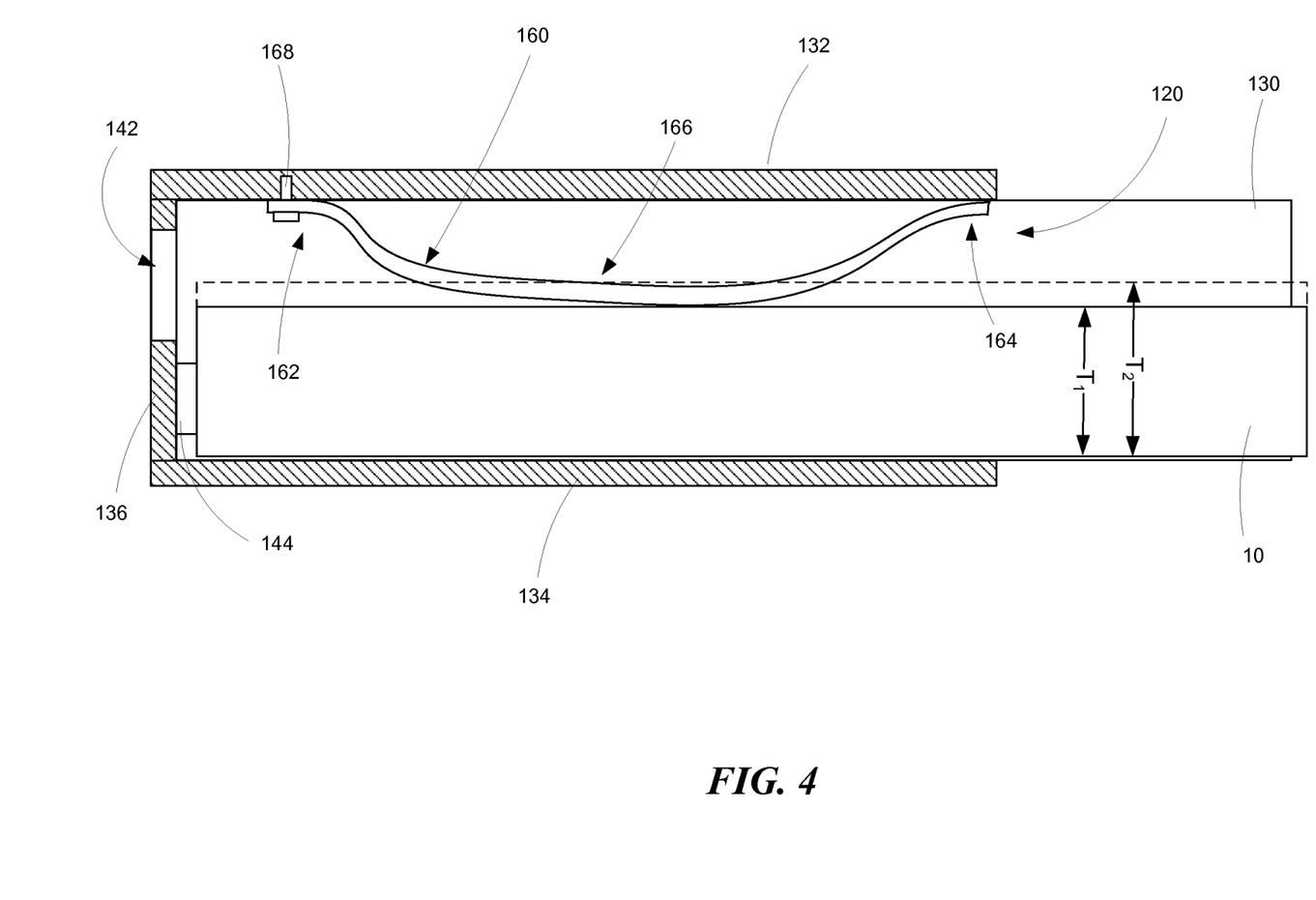
FIG. 4 is a side view in cross-section of a drive bay of FIGS. 1-3 illustrating a leaf spring retainer.

As shown in FIG. 4, each drive bay 120 can include a resilient retainer in the form of a leaf spring 160, for example, that provides a retaining force to engage and snugly hold the storage device 10 in a corresponding drive bay 120. The leaf spring 160 includes a first end portion 162, a second end portion 164, and an arcuate central portion 166 extending therebetween. In some embodiments, the leaf spring 160 is attached to the first panel 132 by a fastener 168, such that the arcuate central portion 166 extends toward the second panel 134 enough so that the storage device 10 will engage and flex the leaf spring 160 when the storage device 10 is inserted into the drive bay 120. It should be appreciated that the leaf spring 160 can be attached to the first panel 132 at only the first end portion 162 with the fastener 168. The leaf spring 160 is movable relative to the first panel 132 between a released position when the storage device 10 is not in the drive bay 120, and an engaged position when the storage device 10 is fully installed in the drive bay 120. Thus, the second end portion 164 is pressed against first panel 132, yet the second end portion 164 can move along the first panel 132, thereby allowing the arcuate central portion 166 to flex and compress, thereby urging the storage device 10 against the second panel 134.

In some embodiments, the distance between the arcuate central portion 166 and the second panel 134 is less than the thickness of the storage device 10, so the leaf spring 160 is compressed when storage device 10 is installed. The leaf spring 160 can also be configured so the drive bay 120 can accommodate storage devices that may have different thicknesses, while still securely holding them in place when installed. For example, 2.5 inch SSDs are available in several thicknesses (e.g., 5 mm, 7 mm, and 9.5 mm). Accordingly, the leaf spring 160 can be configured to accommodate storage devices ranging in thickness between $T_1$ and $T_2$ which, in at least one embodiment, could correspond to 5 mm and 9.5 mm, respectively.

Figure 5:
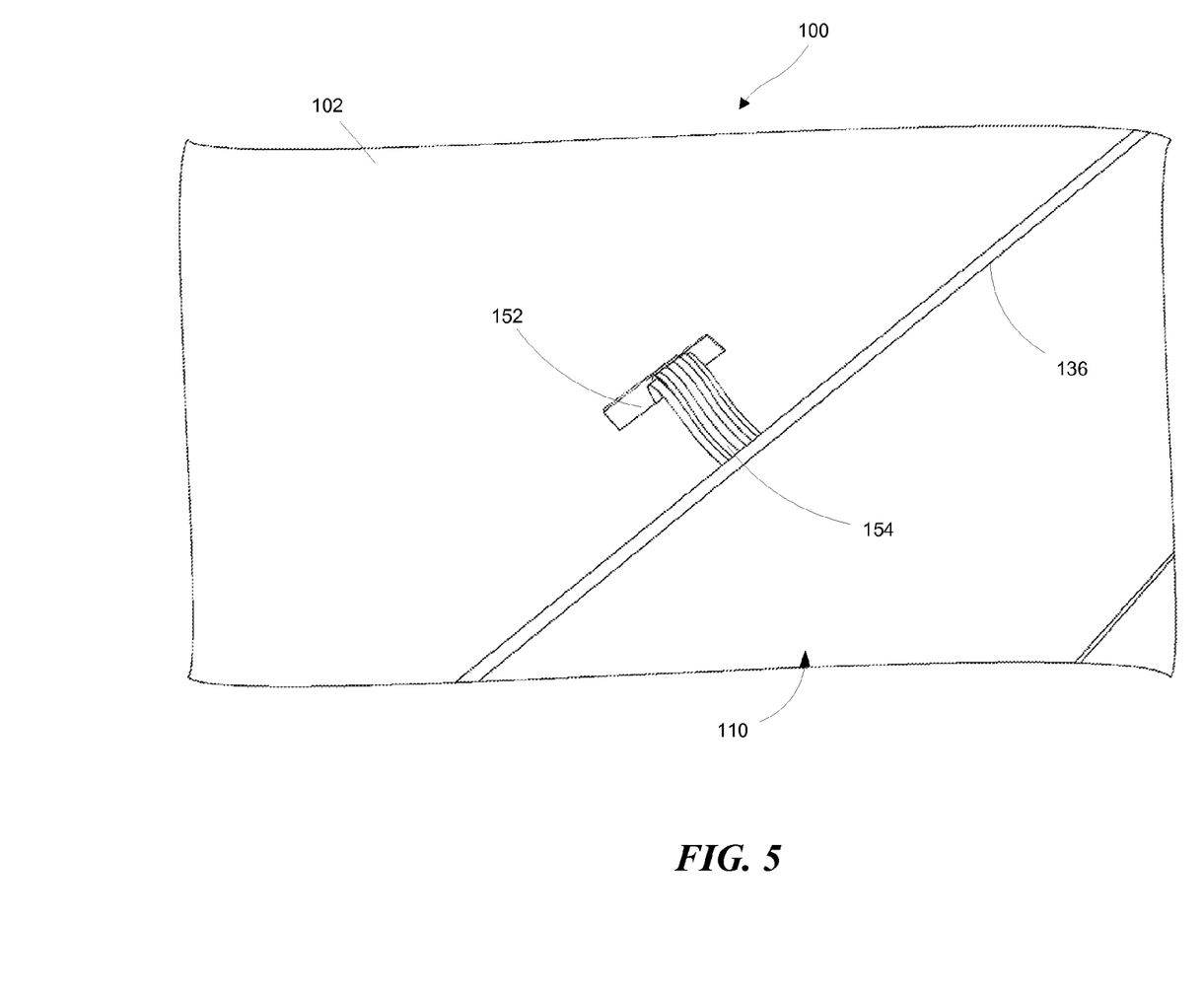
FIG. 5 is an enlarged partial perspective view illustrating the cable interconnecting the backplane and motherboard of the storage device storage tray of FIG. 1.

The storage frame 110 houses multiple storage devices 10, which can be ganged together via the backplane 136. In other words, the backplane 136 connects the connectors 144 together for output through a flexible data communication cable 154, as shown in FIG. 5. The backplane 136 is connected to a motherboard 152 via the flexible data communication cable 154 to accommodate pivoting the storage frame 110 with respect to the chassis 102. The motherboard 152 is mounted to chassis 102 to provide network connectivity to the storage devices 10. The motherboard 152 can be connected to a network connection mechanism engageable when the storage device storage tray 100 is inserted into a server rack.

Remarks

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments. Accordingly, the embodiments are not limited except as by the appended claims.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. It will be appreciated that the same thing can be said in more than one way. Consequently, alternative language and synonyms may be used for any one or more of the terms discussed herein, and any special significance is not to be placed upon whether or not a term is elaborated or discussed herein. Synonyms for some terms are provided. A recital of one or more synonyms does not exclude the use of other synonyms. The use of examples anywhere in this specification, including examples of any term discussed herein, is illustrative only and is not intended to further limit the scope and meaning of the disclosure or of any exemplified term. Likewise, the disclosure is not limited to various embodiments given in this specification. Unless otherwise defined, all technical and scientific terms used herein have the same meaning as commonly understood by one of ordinary skill in the art to which this disclosure pertains. In the case of conflict, the present document, including definitions, will control.

What is claimed is:

1. A storage device storage tray for use with one or more storage devices, comprising:
a chassis including a pair of opposed sidewalls and at least one storage region; and
a storage frame positioned in the at least one storage region and pivotable about a pair of fasteners, each extending through a corresponding one of the pair of opposed sidewalls, the storage frame comprising:
substantially parallel first and second panels;
a backplane extending between the first and second panels;
a plurality of dividers extending away from the backplane and positioned between the first and second panels to define a plurality of drive bays, each configured to receive a storage device, wherein at least one of the plurality of dividers extends beyond the first and second substantially parallel panels; and
a resilient retainer connected to the first panel and positioned in the drive bay to urge the storage device toward the second panel to hold the storage device in the drive bay.

2. The storage device storage tray of claim 1, wherein the at least one resilient retainer comprises a leaf spring.

3. The storage device storage tray of claim 2, wherein the leaf spring is attached at only one end to the first panel.

4. The storage device storage tray of claim 1, wherein the backplane includes a plurality of connectors, each connector aligned with a respective drive bay and positioned to releasably engage the storage device when inserted into the respective drive bay and in engagement with the resilient retainer.

5. The storage device storage tray of claim 4, wherein the backplane includes an air flow aperture positioned adjacent an associated one of the plurality of connectors.

6. The storage device storage tray of claim 1, wherein the storage frame pivots relative to the chassis between a storage position and an access position, whereby the plurality of drive bays can be accessed when the storage frame is moved to the access position.

7. The storage device storage tray of claim 1, further comprising a motherboard attached to the chassis and operably coupleable to the one or more storage devices via the backplane.

8. The storage device storage tray of claim 7, further comprising a flexible data communication cable interconnecting the backplane and the motherboard.

9. A storage device storage tray for use with one or more storage devices, comprising:
a chassis including a pair of opposed sidewalls and at least one storage region;
a motherboard attached to the chassis;
a storage frame positioned in the at least one storage region and pivotable relative to the chassis between a storage position and an access position about a pair of fasteners, each extending through a corresponding one of the pair of opposed sidewalls, the storage frame comprising:
first and second substantially parallel panels;
a backplane extending between the first and second substantially parallel panels and operably coupleable to the one or more storage devices;
a plurality of dividers extending away from the backplane and positioned between the first and second substantially parallel panels to define a plurality of drive bays configured to receive a respective one of the one or more storage devices, wherein at least one of the plurality of dividers extends partially beyond the first and second substantially parallel panels; and
a leaf spring positioned in selected ones of the plurality of drive bays to urge the respective one of the one or more storage devices against the second panel to hold the respective one of the one or more storage devices in the selected ones of the plurality of drive bays; and
a data communications cable interconnecting the backplane and the motherboard.

10. The storage device storage tray of claim 9, wherein the leaf spring is attached at only one end to the first panel.

11. The storage device storage tray of claim 9, wherein the leaf spring includes a first end portion attached to the first panel, a free second end portion opposite the first end portion, and an arcuate central portion extending between the first and second ends and extending toward the second panel.

12. The storage device storage tray of claim 9, wherein the backplane includes a plurality of connectors, each connector aligned with a respective drive bay and positioned to releasably engage a storage device when inserted into the respective drive bay.

13. The storage device storage tray of claim 12, wherein the backplane includes an air flow aperture positioned adjacent an associated one of the plurality of connectors.

14. A storage device storage tray for use with one or more storage devices, comprising:
a chassis including at least one storage region and a pair of opposed sidewalls;
a motherboard attached to the chassis;
a storage frame positioned in the at least one storage region and pivotable about a pair of fasteners, each extending through a corresponding one of the pair of opposed sidewalls, the storage frame comprising:
first and second spaced-apart panels;
a backplane extending between the first and second spaced-apart panels;
a plurality of dividers disposed between the first and second spaced-apart panels to define a plurality of drive bays, each configured to receive a respective one of the one or more storage devices, wherein at least one of the plurality of dividers extends partially beyond the first and second spaced-apart panels; and
a spring member positioned in each drive bay to urge the respective one of the one or more storage devices toward the second spaced-apart panel to hold the respective one of the one or more storage devices in the drive bay; and
a data communications cable interconnecting the backplane and the motherboard.

15. The storage device storage tray of claim 14, wherein the spring member is attached to the first spaced-apart panel at only one end.

16. The storage device storage tray of claim 14, wherein at least one of the pair of opposed sidewalls includes a latch to retain the storage frame in a storage position.

17. A storage device storage tray for use with one or more storage devices, comprising:
a chassis including at least one storage region; and
a storage frame positioned in the at least one storage region, the storage frame comprising:
substantially parallel first and second panels;
a backplane extending between the first and second panels;
a plurality of dividers extending away from the backplane and positioned between the first and second panels to define a plurality of drive bays, each configured to receive a storage device, wherein the plurality of dividers extend beyond the first and second substantially parallel panels; and a resilient retainer connected to the first panel and positioned in the drive bay to urge the storage device toward the second panel to hold the storage device in the drive bay.

18. The storage device storage tray of claim 17, wherein the chassis includes a pair of opposed sidewalls, and wherein the storage frame is pivotably coupled to the pair of opposed sidewalls.

19. A storage device storage tray for use with one or more storage devices, comprising:

a chassis including at least one storage region;

a motherboard attached to the chassis;

a storage frame positioned in the at least one storage region and pivotable relative to the chassis between a storage position and an access position, the storage frame comprising:

first and second substantially parallel panels;

a backplane extending between the first and second substantially parallel panels and operably coupleable to the one or more storage devices;

a plurality of dividers extending away from the backplane and positioned between the first and second substantially parallel panels to define a plurality of drive bays configured to receive a respective one of the one or more storage devices, wherein the plurality of dividers extend partially beyond the first and second substantially parallel panels; and a leaf spring positioned in selected ones of the plurality of drive bays to urge the respective one of the one or more storage devices against the second panel to hold the respective one of the one or more storage devices in the selected ones of the plurality of drive bays; and a data communications cable interconnecting the backplane and the motherboard.

20. The storage device storage tray of claim 19, wherein the chassis includes a pair of opposed sidewalls, and wherein the storage frame is pivotably coupled to the pair of opposed sidewalls.

* * * * *